United States Patent
Anspach

(10) Patent No.: US 6,803,099 B1
(45) Date of Patent: Oct. 12, 2004

(54) SELF-ADHERING SURFACE COVERING AND METHOD OF MAKING

(75) Inventor: Kean M. Anspach, Quarryville, PA (US)

(73) Assignee: Armstrong World Industries, Inc., Lancaster, PA (US)

( * ) Notice: Subject to any disclaimer, the term of this patent is extended or adjusted under 35 U.S.C. 154(b) by 215 days.

(21) Appl. No.: 09/685,305

(22) Filed: Oct. 10, 2000

(51) Int. Cl.$^7$ .......................... B32B 7/12; B32B 15/04; C09J 7/02
(52) U.S. Cl. ................ 428/343; 428/355 RA; 428/40.2; 428/143; 428/150; 428/149
(58) Field of Search .................. 428/343, 355 RA, 428/40.2, 143, 150, 149

(56) References Cited

U.S. PATENT DOCUMENTS

| | | | |
|---|---|---|---|
| 3,293,094 A | 12/1966 | Nairn et al. | 156/79 |
| 3,293,108 A | 12/1966 | Nairn et al. | 161/160 |
| 4,556,595 A | 12/1985 | Ochi | 428/143 |
| 4,574,065 A | 3/1986 | Appleyard et al. | 264/76 |
| 4,804,429 A | 2/1989 | Appleyard et al. | 156/209 |
| 5,141,790 A | 8/1992 | Calhoun et al. | 428/40 |
| 5,362,560 A | 11/1994 | Ehrhart et al. | 428/343 |
| 5,487,929 A * | 1/1996 | Rusincovitch, Jr. et al. | 428/40 |
| 5,795,636 A | 8/1998 | Keller et al. | 428/40.1 |
| 6,006,486 A | 12/1999 | Moriau et al. | 52/589.1 |
| 6,106,916 A | 8/2000 | Lukowski, Sr. | 428/40.1 |
| 6,194,064 B1 * | 2/2001 | Keely et al. | 428/355 RA |

FOREIGN PATENT DOCUMENTS

| | | | |
|---|---|---|---|
| EP | 0 609 603 A1 | 8/1994 | D21H/27/20 |
| EP | 0 638 096 B1 | 2/1995 | C08F/20/18 |
| WO | WO 99/66151 | 12/1999 | E04F/15/04 |

* cited by examiner

Primary Examiner—Victor S Chang

(57) ABSTRACT

A self-adhering surface covering is disclosed having a substrate, a pressure-sensitive adhesive layer which is disposed on the substrate and has an adhesive surface distal from the substrate, and a barrier layer disposed on the adhesive layer. In one aspect, the surface covering has substantially no tack at about 10 psi at 140° F. but has tack at about 20 psi at 75° F. In another aspect, an adhesive which is substantially non-stringing is employed in the adhesive layer. The barrier layer includes substantially non-adhesive particles which have a crash resistance of at least about 10 psi while disposed on the adhesive layer.

A method of making the self-adhering surface covering includes applying an adhesive to a substrate to form an adhesive layer having an adhesive surface, and applying a barrier layer comprising substantially non-adhesive particles to the adhesive surface to form the surface covering. The particles have a crush resistance of at least about 10 psi while disposed on the adhesive layer.

17 Claims, 1 Drawing Sheet

SELF-ADHERING SURFACE COVERING AND METHOD OF MAKING

FIELD OF THE INVENTION

The present invention relates generally to the field of surface coverings. More particularly, the present invention relates to a self-adhering surface covering having a pressure-sensitive adhesive layer and a barrier layer to substantially prevent undesired or premature bonding to a surface and a method of making the same.

BACKGROUND

Self-adhering surface coverings, such as self-adhering floor tiles, have been commercially available for several decades. Typically, such self-adhering surface coverings are packaged in cardboard cartons with 20–50 tiles per carton and have a shipping weight of approximately 10–65 pounds. Commonly, the self-adhering surface coverings consist of a filled polyvinyl chloride substrate having a pressure-sensitive adhesive layer which is covered by a release layer, such as a silicone treated paper. The release layer prevents adherence of the surface covering units to one another when positioned together in the stack. To install such a product, an installer simply peals the release layer from the adhesive layer, places the self-adhering surface covering at a desired site of bonding, and presses the surface covering to adhere the adhesive layer to the surface of the bonding site. Self-adhering surface coverings allow the installer to eliminate a time consuming and often times messy adhesive spreading step. However, the release paper adds to the cost of the product and has the disadvantage of requiring the installer to collect the discarded release paper and provide proper disposal thereof. This disadvantage ranges from an inconvenience on small installation projects to a significant disposal problem on large projects. Regardless of the job size, disposal of the release paper provides an environmental burden in that it is generally not recyclable and often requires its disposal in limited land-fill space.

There are many references describing surface coverings having adhesive layers. For example, U.S. Pat. Nos. 3,331,729 and 3,413,168, both to Danielson et al. describe that a large pressure sensitive adhesive tape or sheet can be made repositionable by partially embedding into the adhesive layer a large number of tiny hollow microspheres, there called "microballoons". The Danielson tape is made by randomly attracting microballoons to a polyethylene-coated paper liner, partially pressing the microballoons into the polyethylene while it is being softened by heat, applying a pressure-sensitive adhesive over the microballoons, and covering the exposed surface of the adhesive with a decorative film. Then after stripping off a paper liner, the protruding microballoons permit the adhesive-bearing decorative film to be slid along the surface of a substrate until it is precisely positioned, whereupon hand pressure is applied to crush the microballoons, thus allowing the adhesive to contact and to become bonded to the substrate.

Large-scale manufacture of the Danielson article requires considerable skill to ensure that the microballoons are uniformly distributed in order to keep every part of the pressure-sensitive adhesive layer from contacting and sticking prematurely to the substrate. Manufacture also requires a special release liner into which the microballoons can be partially embedded.

U.S. Pat. No. 3,314,838 to Erwin describes a repositionable pressure-sensitive adhesive sheet which is similar to those of the Danielson patents except being made by dispersing microballoons into a spreadable liquid from which the pressure-sensitive adhesive is to be coated. The microballoons "show a tendency to appear at the exposed surface" of the resulting pressure-sensitive adhesive layer, thus giving it a pebbled surface that is said to make the sheet repositionable until the microballoons are crushed (col. 2, lines 56–68).

U.S. Pat. No. 4,376,151 to Parrotta shows a pressure-sensitive adhesive sheet which, like that of Erwin, has hollow microspheres or microballoons at the surface of its pressure-sensitive adhesive layer, but its adhesive has substantially no adhesive tack except upon application of a threshold pressure. The Parrotta sheet is said to differ from that of Erwin because the latter is activated by very low pressure and is somewhat tacky to the fingers.

U.S. Pat. No. 3,301,741 to Henrickson et al. makes a pressure-sensitive adhesive sheet repositionable by shaping its surface into a pebbly contour of small protrusions that are covered by non-adhesive, continuous, fragile protective caps. Those caps had been formed by embossing polyethylene-coated paper to form a uniform array of depressions, filling the depressions with non-adhesive material such as a solution of polymethylmethacrylate, and wiping the solution off the areas between the depressions. After the sheet has been positioned, pressure is applied, shattering the caps and causing the adhesive to flow around the fragments into intimate contact with a substrate to which the sheet is being applied.

U.S. Pat. No. 4,556,595 to Ochi makes a pressure-sensitive adhesive sheet repositionable by the random application of tiny solid particles over the adhesive surface. After the sheet has been positioned over a substrate, pressure is applied to force the particles into the adhesive, thus allowing the adhesive to contact and become bonded to the substrate. The Ochi patent preferably employs a "release paper in order to prevent intrusion and dispersion of the non-adhesive solid particles in the adhesive which may occur by application of some pressure during storage" (col. 9, lines 2–7). However, it does not explain how that release paper can prevent the particles from being pushed into the adhesive layer to destroy their utility.

In U.S. Pat. No. 3,554,835 to Morgan, the face of a pressure-sensitive adhesive sheet is provided with dots of release material that permit the sheet to be slid over a substrate until pressure is applied to force the adhesive into contact with the substrate.

In U.S. Pat. No. 4,054,697 to Reed et al., the face of a pressure sensitive adhesive sheet is provided with a coating of a discontinuous layer of resilient, non-adhesive, solid particles that permit repositioning on a substrate until the particles are deformed under pressure to such an extent as to bring the adhesive and the substrate into filler contact.

Common to the background discussed above is that the particles are used to make a pressure-sensitive adhesive surface coverings repositionable and do not address the problem of preventing adherence to adjacent surfaces during storage under loads and potentially high temperatures. Hence, if sufficient particles have been employed to ensure that every portion of the pressure-sensitive adhesive layer is safely kept out of contact with the substrate to which it is being applied, the particles may have such high density as to interfere with the bonding strength. In other words, if high bonding strength is required, it may be necessary to reduce the amount of particles even though some pieces of the pressure sensitive adhesive sheet might become prematurely bonded to a substrate and thus need to be destroyed. Further, if the surface covering has a decorative substrate which is thin, such as a vinyl film, an additional problem can occur when pressure is applied to force its pressure-sensitive adhesive into bonding contact with a surface by the particles being forced into the adhesive layer to produce a disfiguring pimpling of the substrate.

Despite existing self-adhering surface coverings which employ particles to prevent undesired adherence to surfaces, the need remains for a self-adhering surface covering which does not employ a release layer and is inexpensively produce. Further, there remains a need for a method of manufacturing such a self-adhering surface covering. Accordingly, it is to the provision of a self-adhering surface covering that meets these needs that the present invention is primarily directed.

SUMMARY OF THE INVENTION

This invention overcomes the disadvantages of the prior art by providing a self-adhering surface covering which avoids undesired adherence of the surface covering under loads which can be experienced during shipping and storage to surfaces without employing a release layer or paper. In accordance with the present invention, the self-adhering surface covering comprises a substrate having first and second surfaces, a pressure sensitive adhesive layer disposed on the second surface of the substrate and has an adhesive surface distal from the second surface, and a barrier layer disposed on the adhesive surface. In one aspect, the self-adhering surface covering has substantially no tack at about 10 pounds/inch$^2$ ("psi") at about 140° F. when placed in contact with the first surface of an adjacent substrate, but has tackiness when subjected to a load of about 20 psi at about 75° F. In another aspect, the adhesive layer comprises a substantially non-stringing adhesive. Substantially non-adhesive particles comprise the barrier layer. Such particles while disposed on the adhesive layer resist crushing when subjected to a load of at least about 10 psi, yet are crushable when subjected to a load of about 20 psi or greater. Additionally, the particles have a diameter which is at least about equal to or greeter than the thickness of the adhesive layer. In one embodiment of the present invention, particles are distributed randomly and substantially uniformly over the surface of the adhesive layer. In an alternative embodiment, at least a portion of the particles is distributed over the surface of the adhesive layer in a pattern or design.

Further, in accordance with the present invention, a method of making the self-adhering surface covering comprises applying an adhesive to a substrate to form an adhesive layer having an adhesive surface, and applying a barrier layer comprising substantially non-adhesive particles to the adhesive surface to form the self-adhering surface covering. The particles, while disposed on the adhesive layer, resist crushing when subjected to a load of at least about 10 psi, but are crushable when subjected to a load of about 20 psi or greater. In one aspect of the method of the present invention, the self-adhering surface covering has substantially no tack at about 10 psi at about 140° F. but has tack at about 20 psi at about 75° F. In another aspect of the method of the present invention, the adhesive layer comprises a substantially non-stringing adhesive.

Thus, a unique self-adhering surface covering and a method of making the same is now provided that successfully addresses the shortcomings of existing self-adhering surface coverings and provides distinct advantages over such self-adhering surface coverings. Additional objects, features, and advantages of the invention will become more apparent upon review of he detailed description set forth below when taken in conjunction with the accompanying drawing figures, which are briefly described as follows.

DETAILED DESCRIPTION OF THE INVENTION

Figure 1:
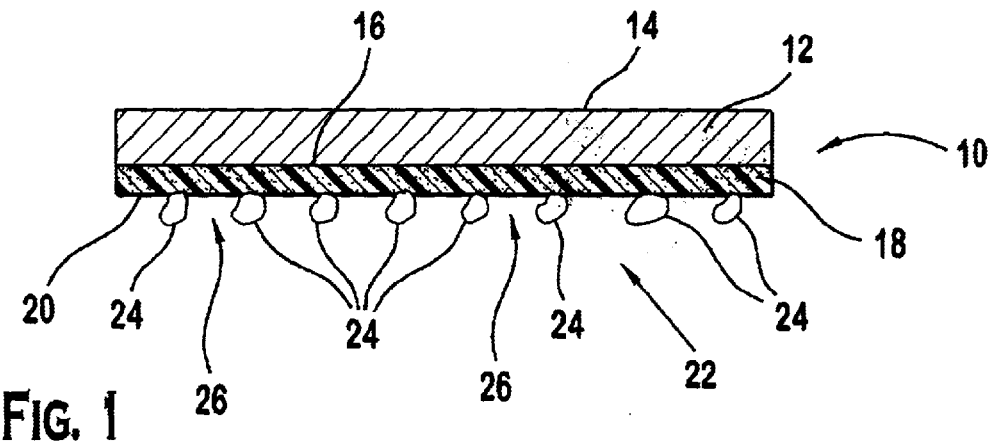
FIG. 1 is a partial elevation, cross-sectional view of a self-adhering surface covering made in accordance with the present invention.

For a more complete understanding of the present invention, reference should be made to the following detailed description taken in connection with the accompanying drawings, wherein like reference numerals designate corresponding parts throughout the several figures. Referring first to FIG. 1, a self-adhering surface covering 10 made in accordance with the present invention is shown. The self-adhering surface covering 10 comprises a substrate 12, a pressure-sensitive adhesive layer 18, and a barrier layer 22. As illustrated in FIG. 1, the substrate 12 has a first surface 14 and a second surface 16. The adhesive layer 18 is disposed on the second surface 16 of the substrate 12 and has an adhesive surface 20 that is distal from the second surface 16. The barrier layer 22 comprises substantially non-adhesive particles 24 which are distributed over the adhesive surface 20 of the adhesive layer 18. Such particles 24 while disposed on the adhesive layer 18 resist crushing when subjected to a load of at least about 10 psi, yet are crushable when subjected to a load of about 20 psi or greater. Additionally, the particles 24 have a diameter that is at least about equal to or greater than the thickness of the adhesive layer, thereby providing interstitial space 26 between the adhesive layer and a potential bonding surface. In other words, the particle diameter/adhesive layer thickness ratio is at least equal to or greater than about 1. Particles 24 are distributed randomly and substantially uniformly over the adhesive surface 20 in one embodiment of the present invention. Further, in an alternative embodiment, at least a portion of the particles 24 are distributed over the adhesive surface 20 in a pattern or design. In one aspect of the present invention, by disposing the barrier layer 22 onto the adhesive layer 18, the adhesive layer 18 has substantially no tack at about 10 psi at about 140° F. when placed in contact with a substantially non-adhesive surface, yet has tack when subjected to a load of about 20 psi or greater at about 75° F. In another aspect of the present invention, as discussed further below, the adhesive layer comprises a substantially non-stringing adhesive. Accordingly, the self-adhering surface covering 10 is separateably stackable and/or rollable, barrier layer 22 to the first surface 14 of substrate 12, without employing a release layer between adjacent surface coverings 10.

The substrate 12 can be selected from, but not limited to, sheet, tile, strip, board, parquet, and the like. Such substrates 12 comprises monomers, polymers, plastics, resins, including reinforced resins, rubbers, papers, cloths, metals, wood, composites thereof in desired combinations, venires thereof in desired combinations, and laminates thereof in desired combinations, to name only a few. Substrates 12 employed with the present invention are not limited to any specific range of thickness or composition, but should have sufficient rigidity or resilience to prevent formation of protrusions or perforations by the particles 24 when subjected to a load below which the particles 24 crush. The substrates 12 may be decorative and have any desired color or colors, printed characters, design, patterns, etc., as is the case with colored, printed, or decorative tiles, sheets, and laminates. Examples of substrates 12 which may be employed in the present invention are described in U.S. Pat. Nos. 6,006,486, 4,804,429, 4,574,065, 3,293,108, and 3,293,094 and PCT Patent Application Serial No. WO 99/66151, all of which are incorporated herein in their entirety.

Various pressure-sensitive adhesives are known and can be utilized in the present invention to comprise the adhesive layer 18. The adhesive is applied to the substrate 12 by a conventional coating apparatus (not shown) such as a reverse roll coater, a forward roll coater, a doctor blade, an air knife, or other similar coating apparatus. Although there is no specific limiting chemistry or composition of the adhesive, the adhesive employed should have the following properties. The initial tack of the adhesive is sufficient to bond or hold the particles 24 to the adhesive surface 20 and substantially maintain the barrier layer 22 in contact with the adhesive surface 20 while the barrier layer 22 is facing the earth or in an installation position. Additionally, it is desirable for the adhesive to have some degree of compression/penetration resistance of the particles 24 and be non-stringing. However, at least some of the particles 24 may be partially embedded in the adhesive layer 14. In the present invention, non-stringing means that when the adhesive surface 20 of substrate 12/adhesive layer 18 assembly, i.e. a surface covering 10 absent the barrier layer 22, is placed in contact with the adhesive surface 20 of a like assembly for about 15 seconds at a pressure of about 2 psi at about 75° F. and subsequently pried apart, the respective adhesive layers 18 substantially do not mix or deform by stretching and forming stringers. The thickness of the adhesive layer 18 can be conventionally determined. In view of adhesion strength and economy, the adhesive layer 18 typically has a thickness of about 1 to about 2 mils, but can be either less than 1 mil or greater than 2 mils, depending upon the adhesive employed. Examples of such pressure-sensitive adhesives include rubber-type adhesives, acrylic adhesives, including e-beam curable acrylic adhesives, vinyl acetate-type adhesives, urethane-type adhesives, and combinations thereof.

Examples of the rubber-type adhesives include, but are not limited to, adhesives comprising natural rubber, isoprene rubber, styrene-butadiene rubber, styrene-butadiene block copolymer, styrene-isoprene block copolymer, butyl rubber, polyisobutylene, silicone rubber, polyvinyl isobutyl ether, chloroprene rubber, nitrile rubber, mixtures of the forgoing, and adhesives comprising at least one of these as a main component. Those which have some crosslinked structure between the molecules can also be employed.

Examples of the acrylic adhesives include, but are not limited to, those comprising homopolymers, copolymers, or crosslinked copolymers of at least one acrylic or methacrylic component, for example acrylic esters such as methyl acrylate, ethyl acrylate, n-propyl acrylate, isopropyl acrylate, n-butyl acrylate, isobutyl acrylate, tert-butyl acrylate, amyl acrylate, hexyl acrylate, octyl acrylate, 2-ethylhexyl acrylate, undecyl acrylate, tridecyl acrylate, or lauryl acrylate, and optionally as a comonomer, a carboxyl-containing monomer such as (meth)acrylic acid, wherein the expression "(meth)acrylic" acid denotes acrylic acid and methacrylic acid, itaconic acid, crotonic acid, maleic acid, maleic anhydride, or butyl maleate, a hydroxyl-containing monomer such as 2-hydroxyethyl(meth)acrylate, 2-hydroxypropyl(meth)acrylate or allyl alcohol, an amido-containing monomer such as (meth)acrylamide, N-methyl (meth)acrylamide, or N-ethyl(meth)acrylamide, a methylol group-containing monomer such as N-methylol(meth) acrylamide or dimethylol(meth)acrylamide, an amino-containing monomer such as aminoethyl(meth)acrylate, dimethylaminoethyl(meth)acrylate, or vinylpyridine, or a non-functional monomer such as ethylene, propylene, styrene, or vinyl acetate; mixtures thereof; and adhesives containing at least one such adhesives as a main component.

Examples of the vinyl acetate-type adhesives include, but are not limited to, those comprising polyvinyl acetate, a copolymer of vinyl acetate with a copolymerizable monomer such as ethylene or vinyl chloride, a mixture thereof, or those which comprises at least one of these as a main component.

Examples of the urethane-type adhesives include, but are not limited to, those comprising polymeric compounds formed by the reaction of an isocyanate such as triphenylmethane-p,p',p"-triisocyanate, hexamethylene diisocyanate, diphenylmethane4,4'-diisocyanate, or toluene-diisocyanate with a compound having an active hydrogen atom such as polyesters having active hydrogen, polyether glycol, polyacrylates, or polyamides, mixtures thereof, and those which contain at least one of these as a main component.

The above-exemplified pressure-sensitive adhesives can be properly selected and used in the pressure-sensitive adhesive layer 18 of the present invention. In the selection of the adhesive to be employed, the specific handling, shipping, and installation of the surface covering 10 should be considered For example, if the surface covering 10 is to be utilized as a flooring tile (see Example 3 below), tests should be conducted to simulate storage, to dropping, and adhesion. Storage testing includes packing such tiles in shipping boxes and stacking such boxes for storage and shipment. Drop testing includes dropping such packed boxes to simulate accidental dropping. Adhesion testing includes simulating actual installation of the surface covering 10. When it is desired to have a high adhesion strength developed rapidly after pressure bonding, relatively soft adhesives can be employed and when it is desired to have an adhesion strength developed relatively slowly after pressure bonding, relatively hard adhesives can be employed. The degree of softness of the adhesive can be properly selected also according to the ease of the bonding operation, the initial adhesiveness, and the particle 24 size and amount of the particles 24, and can be varied over a wide range as long as the particle size/adhesive layer thickness ratio is about equal to or greater than 1. Further, the pressure-sensitive adhesive should have a low heat sensitivity such that the adhesive is substantially non-flowable at a temperature below about 140° F.

In the barrier layer 22, the particles 24 have an average particle size about equal to or greater than the thickness of the adhesive layer 18, typically between about 2 to about 6 mils and are either solid, porous, or hollow. Accordingly, the average particle size can be less than 2 mils and greater than 6 mils. Depending upon the surface covering 10 use, installation requirements, or the adhesion requirements, the particles 24 crush at a load of about 20 psi or greater, thereby permitting the crushed particles 24 to be embedded within the adhesive layer 18. Fragments of the particles 24 are not likely to remain on the bonded adhesive surface 20 of the adhesive layer 18, and by the bonding operation, are embedded and dispersed randomly in the pressure-sensitive adhesive layer 18, thus tending to act as a favorable filler. In other words, the particles 24 are deformable or fragile under conditions employed for pressure-bonding the surface covering 10 to a desired site of bonding. Particles 24 employed in the present invention are non-adhesive, that is, having little or no adhesiveness or tack, thereby not having the tendency to increase the initial adhesion strength of the adhesive layer 18.

There is no particular restriction on the kind of the non-adhesive particles 24 so long as they satisfy the aforesaid particle crush conditions typically encountered for handling and installing the surface covering 10. Examples of such particles 24 include inorganic and organic particles and mixtures thereof. Inorganic particles include, but are not limited to, calcium carbonate or limestone, barium carbonate, calcium sulfate, barium sulfate, aluminum sulfate, molybdenum disulfide, titanium oxide, aluminum hydroxide, alumina, silica, magnesium oxide, calcium oxide, calcium hydroxide, ferrous oxide, ferric oxide, derivatives thereof, and combinations thereof. Organic particles include, but are not limited to, cured rubbers, ebonite, lignin-phenol resin, styrene resin, metal melamine resin, other resins, derivatives thereof, and combinations thereof.

As indicated above, the particles 24 are randomly and uniformly distributed on the adhesive surface 20 of the adhesive layer 18. The "uniform distribution", as used herein, does not mean that the particles must be, although they may be, regularly and uniformly distributed, but it is sufficient that they are dispersed uniformly when observed macroscopically. In one embodiment, the particles 24 of the barrier layer 22 cover from about 1% to about 10% of the adhesive surface 20. In another embodiment, the particles 24 cover about 2% of the adhesive surface 20. Alternatively, the particles 24 are distributed onto the adhesive surface 20 in an amount between about 0.05 and about 0.2 grams/ft$^2$ of adhesive surface 20. In a further alternative embodiment, the particles 24 are distributed onto the adhesive surface 20 in an amount between about 0.01 and about 0.1 cm$^3$/ft$^2$ of adhesive surface. The amount of the particles 24 can be easily selected and determined experimentally as required by those skilled in the art depending upon the degree of softness or hardness of the pressure-sensitive adhesive, the thickness of the adhesive layer 18, the particle size conditions and type of the particles 24 employed, the distributed state of the particles 24 on the adhesive surface 20 of the adhesive layer 18, the desired initial adhesion strength, etc.

Figure 2:
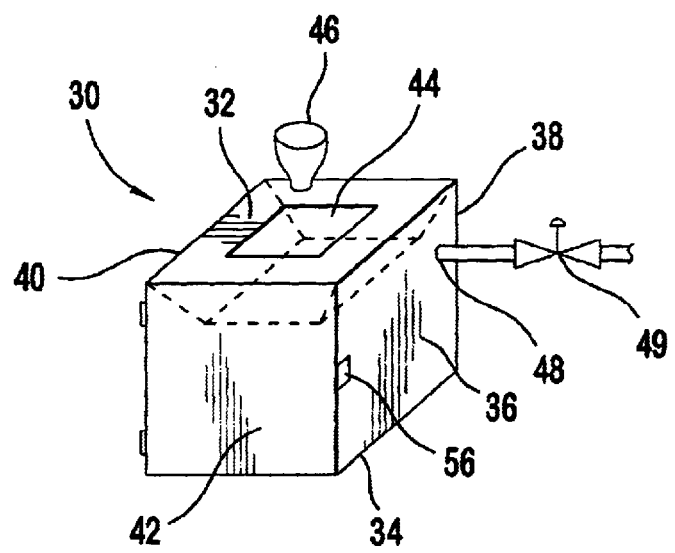
FIG. 2 is a perspective view of an embodiment of a chamber employed in a process of making the self-adhering surface covering of FIG. 1 in accordance with the present invention.
Figure 3:
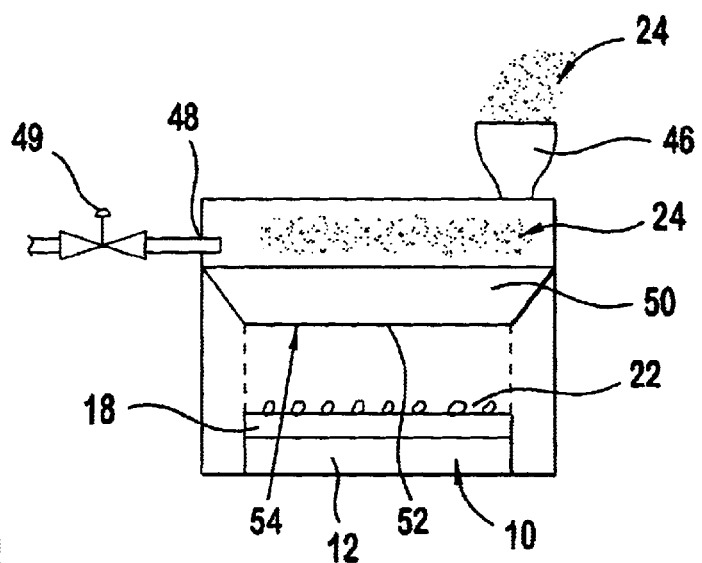
FIG. 3 is a partial front elevation view of another embodiment of the chamber.

Now, referring to FIGS. 2 and 3, a chamber 30 is illustrated which is employed during particle 24 application. The chamber 30, has a top side 32, a bottom side 34, and three vertical sides 36, 38, and 40 extending from the bottom side 34 to the top side 32. A door 42 is provided to permit access to the interior of the chamber 30. To assist in air flow within the chamber 30, which is further discussed below, the top side 32 comprises a screen 44 having a mesh number sufficiently large to prevent the particles 24 from exiting the chamber 30 during barrier layer 22 application to the adhesive layer 18. Extending outwardly from the top side 32 is a hopper 46 which is operably connected to the interior of the chamber 30. The location of the hopper 46 is not critical, but it has been found that substantially uniform distribution of the particles 24 occurs when the hopper 46 is proximate the intersection of either vertical side 38 and either vertical sides 36 or 40 or the intersection of the door 42 and either vertical sides 36 or 40. As illustrated, a port 48 having a valve 49 extends outwardly from vertical side 36 and is operably connectable to a fluid source, such as compressed air. The port 48 can extend outwardly from either of the vertical sides 36, 38, or 40, but should be disposed on the vertical side opposite the hopper 46. Additionally, the port 48 can extend outwardly from the door 42. To assist in barrier layer 22 application when particles are being applied to a substrate 12/adhesive layer 18 assembly in which the substrate 12 is smaller than the bottom side 34, a funnel 50 is disposed within the interior of the chamber 30. The funnel 50 is mounted to vertical sides 36, 38, and 40 and extends from vertical sides 36, 38, and 40 and the door 42 downwardly toward the bottom side 34 to terminate at a funnel edge 52, thereby forming an opening 54. In one embodiment, the opening 54 has substantially the same peripheral shape as the substrate 12. That is, the funnel edges 52 align with the edges of the substrate. Accordingly, it has been discovered that substantially all of the particles 24 introduced into the interior of the chamber 30 through the hopper 46 accumulate on the adhesive layer 18.

In operation, a substrate 12/adhesive layer 18 assembly 11 is positioned within the chamber 30, and the door 42 is closed and secured by a latch 56. The valve 49 is opened and a fluid, such as air or any gas which is inert with resect to the composition of the substrate 12, adhesive layer 18, and barrier layer 22, is introduced into the chamber at a rate of about 3.5 standard cubic feet per minute ("SCFM") to about 12 SCFM. In one aspect of the invention, the fluid flow rate is about 7 SCFM. The fluid flow rate can be adjusted either higher or lower than about 3.5 SCFM to about 12 SCFM depending upon the particles 24 and the adhesive employed, and such flow rate can be determined through routine experimentation. Thereafter, the particles 24 are fed into the interior of the chamber 30 through the hopper 46, whereby the particles 24 adhere to the adhesive surface 20 to form the barrier layer 22 and the surface covering 10.

EXAMPLES

Example 1

Preparation of Adhesive

A mixture of tridecyl acrylate ("TDA") and acrylic acid ("AA") (88% TDA/12% AA) was quickly charged into a chemical reactor under a dry nitrogen purge. The reactor was equipped with stirring and cooling capabilities, and the mixture was stirred under the nitrogen purge for 15 minutes at a temperature below about 100° F. Thereafter, the nitrogen purge was terminated, and 11.8 ppm of a 55% benzoyl peroxide in plasticizer was charged quickly into the stirred reactor. The reactor was allowed to exotherm, and the temperature was recorded with respect to time. When the exotherm had peaked and the temperature dropped one degree from the maximum, the reactor was cooled by circulating chilled water through its cooling jacket. Upon the temperature reaching about 225° F., the reactor was purged with dry air and cooling was continued to about 75° F. Thereafter, the reacted blend was pumped or moved into totes or drums and transferred to an adhesive applicator. The viscosity of the final batch was about 100 cps as determined by ASTM Standard 1084-97 (Brookfield #21 spindle-100 rpm) at 75° F.

Example 2

Preparation of Surface Covering

The reacted mixture of Example 1 was coated at a thickness of 1–2 mils onto the second surface of a floor tile, Standard EXCELLON Vinyl Composition Tile-IMPERLAL Pattern number 51899 manufactured by Armstrong World Industries, Inc., Lancaster, Pa., using a forward roll coater equipped with a 45 Q Anilox roll with a cell volume of 49.7 CBM ("cubic billion microns"). Subsequently, the coated tile was passed under an electron beam curing unit operating at 300 KEV and subjected to 12 Mrad of radiation to produce a cured, but tacky to the touch, adhesive surface. Subsequently, calcium carbonate particles having a diameter of about 2–3 mils were applied to the adhesive surface at an application rate of about 0.1 g/ft$^2$ as described above.

Example 3
Evaluation of Barrier Layer of Surface Covering

Table 1 below describes the results obtained from evaluations of different particles with a 1–2 mil thick adhesive layer. Although not required, performance of the surface covering in a tile application is deemed acceptable upon passing of all three of the following listed tests. The dropping test was conducted by dropping a 65 pound carton of IMERLAL brand tile substantially vertically from a one foot height directly onto a single tile made as described in Examples 1 and 2 above, with the barrier layer adjacent a clean, smooth, and polished tile floor (IMPERIAL brand tiles manufactured by Armstrong World Industries, Inc., Lancaster, Pa.). The particles were then viewed under a microscope (magnification 40×) to determine the amount of breakage of the particles. In the stacking test, a tile made as described in Examples 1 and 2 above and place under four 65 pound cartons of IMPERLAL brand tile for about 1 hour. Thereafter, the cartons were removed and the test tile was evaluated for blocking, i.e. sticking to each other. The adhesion test was conducted by applying a 180 pound load onto a 9 inch$^2$ area of the tile made as described in Examples 1 and 2 above with the barrier layer adjacent clean, smooth, and polished tile floor (IMERIAL brand tiles manufactured by Armstrong World Industries, Inc., Lancaster, Pa.) and thereafter pulling the tile from floor to determine strength of bond. Particles evaluated during the test included limestone particles, EXTENDOSPHERES, and SPERIGLASS. Limestone particles were screened from nominal 40 mesh limestone obtained from Global Stone Pen Roc. 2–3 mils, 3–4 mils, and 3–6 mils EXTENDOSPHERES, which are hollow ceramic spheres comprising mullite and glass, were screened from SLG EXTENDOSPHERES obtained from PQ Corporation, Valley Forge, Pa., as follows:

2–3 mils—particles screened through a 200 mesh screen onto a 270 mesh screen

3–4 mils—particles screened through a 140 mesh screen onto a 200 mesh screen

3–6 mils—particles screened through a 100 mesh screen onto a 200 mesh screen

SPHERIGLASS particles employed were particles marketed under the brand SPHERIGLASS 2530, which were also obtained from PQ Corporation.

TABLE 1

| Particle type | size | density g/cc | Amount applied g/SF | dropping test | stacking test | adhesion test |
|---|---|---|---|---|---|---|
| Limestone | 2–3 mils | 2.7 | 0.1 | pass | pass | pass |
| Limestone | 2–3 mils | 2.7 | 0.15 | — | pass | pass |
| Limestone | 2–3 mils | 2.7 | 0.2 | — | — | pass |
| Limestone | 2–3 mils | 2.7 | 0.3 | — | — | marginal |
| Limestone | 2–3 mils | 2.7 | 0.4 | — | — | fail |
| Limestone | 3–4 mils | 2.7 | 0.1 | pass, some breakage | pass | fail |
| Limestone | 3–4 mils | 2.7 | 0.05 | pass, some breakage | — | pass |
| Limestone | 3–6 mils | 2.7 | 0.05 | pass, significant breakage | pass | pass |
| Limestone | 2–3 mils + 3–4 mils (50/50) | 2.7 | 0.05 + 0.05 | pass, some breakage | — | pass |
| Extendo-spheres | 2–3 mils | 0.73 | 0.06 | fail - 100% breakage | pass - 20–50% breakage | pass |
| Extendo-spheres | 2–3 mils | 0.73 | 0.1 | — | pass - 20–50% breakage | pass |
| Extendo-spheres | 2–3 mils | 0.73 | 0.2 | fail - 100% breakage | pass - 20–50% breakage | pass |
| Extendo-spheres | 3–6 mils | 0.73 | 0.06 | — | pass - 20–50% breakage | pass |
| Extendo-spheres | 3–6 mils | 0.73 | 0.01 | — | pass - 20–50% breakage | pass |
| Extendo-spheres | 3–6 mils | 0.73 | 0.2 | — | pass - 20–50% breakage | pass |
| Spheriglass | 2–3 mils | 2.5 | 0.1 | — | — | marginal |
| Spheriglass | 2–3 mils | 2.5 | 0.2 | — | — | fail |

With respect to the above description then, it is to be realized that the optimum dimensional relationships for the parts of the invention, to include variations in size, materials, shape, form, function and manner of operation, assembly, and use, are deemed readily apparent and obvious to one skilled in the art, and all equivalent relationships to those illustrated in the drawings and described in the specification are intended to be encompassed by the present invention. Further, the various components of the embodiments of the invention may be interchanged to produce further embodiments and these further embodiments are intended to be encompassed by the present invention.

Although the invention has been described in detail for the purpose of illustration, it is understood that such detail is solely for that purpose, and variations can be made therein by those skilled in the art without departing from the spirit and scope of the invention which is defined by the following claims.

What is claimed is:

1. A self-adhering surface covering comprising:

a substrate;

a pressure-sensitive adhesive layer disposed on the substrate and having an adhesive surface located opposite the substrate, the adhesive layer comprising an adhesive, the adhesive being substantially non-stringing; and a barrier layer disposed substantially on and covering from about 1% to about 10% of the adhesive surface, wherein the barrier layer comprises a plurality of particles, the particles having a diameter substantially equal to or greater than the thickness of the adhesive layer, the particles being substantially non-adhesive, wherein the barrier layer exhibits a crush resistance of at least about 10 psi and is crushable when subjected to a load of about 20 psi or greater, and wherein the particles are selected from the group consisting of solid particles and porous particles.

2. The surface covering as claimed in claim 1, wherein the particles are substantially uniformly distributed over the surface of the adhesive layer.

3. The surface covering as claimed in claim 1, wherein at least some of the particles are distributed on the adhesive surface in a pattern.

4. The surface covering as claimed in claim 1, wherein the particles have a diameter substantially greater than the thickness of the adhesive layer.

5. The surface covering as claimed in claim 1, wherein the particles have a diameter substantially from about 2 to about 6 mils.

6. The surface covering as claimed in claim 1, wherein the particles are distributed onto the adhesive surface in an amount from about 0.05 to about 0.2 grams/ft$^2$ of adhesive surface.

7. The surface covering as claimed in claim 1, wherein the particles are distributed onto the adhesive surface in an amount from about 0.01 to about 0.1 cm$^3$/ft$^2$ of adhesive surface.

8. The surface covering as claimed in claim 1, wherein the particles cover about 2% of the adhesive surface of the adhesive layer.

9. The surface covering as claimed in claim 1, wherein the particles are collapsible or fragile under conditions employed for pressure-bonding the surface covering to a desired site of bonding.

10. The surface covering as claimed in claim 1, wherein the adhesive layer has a thickness from about 1 to about 2 mils.

11. The surface covering as claimed in claim 1, wherein the pressure-sensitive adhesive layer comprises an adhesive selected from natural rubber adhesives, synthetic rubber adhesives, acrylic adhesives, vinyl acetate adhesives, urethane adhesives, and mixtures thereof.

12. The surface covering as claimed in claim 1, wherein the pressure-sensitive adhesive layer comprises an e-beam curable adhesive formed from tridecyl acrylate and acrylic acid.

13. The surface covering as claimed in claim 1, wherein at least some of the particles are partially embedded in the adhesive layer.

14. The surface covering as claimed in claim 1, wherein the particles are capable of substantially resisting crushing upon being subjected to a load of about 60 lb/ft$^2$ which is dropped a vertical distance of about 1 foot.

15. The surface covering of claim 1, wherein the non-adhesive particles are selected from the group consisting of calcium carbonate, barium carbonate, calcium sulfate, barium sulfate, aluminum sulfate, molybdenum disulfide, titanium oxide, aluminum hydroxide, alumina, silica, magnesium oxide, calcium oxide, calcium hydroxide, ferrous oxide, ferric oxide, cured rubbers, ebonite, resins, and combinations thereof.

16. The surface covering of claim 1, wherein the substrate is substantially rigid.

17. The surface covering of claim 1, wherein the barrier layer further comprises a second plurality of particles, the particles of the second plurality being substantially non-adhesive hollow particles.

* * * * *